(12) United States Patent
Jachmann et al.

(10) Patent No.: US 6,820,249 B1
(45) Date of Patent: Nov. 16, 2004

(54) SYSTEM AND METHOD FOR INTERCONNECTING COMPONENTS

(75) Inventors: Thomas Jachmann, Nürnberg (DE); Klaus Neuberger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/913,496

(22) PCT Filed: Feb. 2, 2000

(86) PCT No.: PCT/DE00/00313

§ 371 (c)(1),
(2), (4) Date: Aug. 16, 2001

(87) PCT Pub. No.: WO00/49497

PCT Pub. Date: Aug. 24, 2000

(30) Foreign Application Priority Data

Feb. 16, 1999 (DE) ........................... 199 06 358

(51) Int. Cl.[7] ................................. G06F 9/44
(52) U.S. Cl. ........................ 717/108; 717/100
(58) Field of Search .............. 717/100, 114–119, 717/162–167, 120–123, 106–109

(56) References Cited

U.S. PATENT DOCUMENTS

| | | | | |
|---|---|---|---|---|
| 5,915,113 A | * | 6/1999 | McDonald et al. | 717/109 |
| 6,003,037 A | * | 12/1999 | Kassabgi et al. | 707/103 R |
| 6,151,700 A | * | 11/2000 | Fox | 717/107 |

OTHER PUBLICATIONS

Batory et al. Validating Component Compositions in Software System Generators. IEEE. 1996. pp. 72–81.*
Marvie et al. Towards a Dynamic CORBA Component Platform. IEEE. 2000. pp. 305–314.*
Steve Robinson et al.; ActiveX Magic: An ActiveX Control and DCOM Sample Using ATL–Overview, May 1997.
Steve Robinson et al.; ActieX Magic: An ActiveX Control and DCOM Sample Using ATL, May 1997, Part 2.
Steve Robinson et al.; ActiveX Magic: An ActiveX Control and DCOM Sample Using ATL, May 1997, Part 3.
Steve Robinson et al.; ActiveX Magic: An ActiveX Control and DCOM Sample Using ATL, May 1997, Part 4.
The Component Object Model Specification, version 0.9, Microsoft Com Resources, Oct. 24, 1995.
Markus Horstmann et al., "DCOM Architecture", Jul. 23, 1997.
Scott Lewandowski, "Frameworks for Component–Based Client/Server Computing", ACM Computing Surveys, vol. 30, No. 1, Mar. 1, 1998.

* cited by examiner

Primary Examiner—Wei Zhen
(74) Attorney, Agent, or Firm—Staas & Halsey LLP

(57) ABSTRACT

The invention relates to a system and a method for interconnection of components, in particular of software components for at least one data processing application. For interconnection of the components without special programming, for example in the form of what is referred to as glue code, the invention proposes that the components have at least one interface which is intended for direct interconnection of components. In an alternative embodiment, the components have interfaces which are interconnected with one another via an interconnection component.

18 Claims, 1 Drawing Sheet

SYSTEM AND METHOD FOR INTERCONNECTING COMPONENTS

This application is a 371 of PCT/DE00/00313 filed Feb. 2, 2000.

BACKGROUND OF THE INVENTION

1. Field of the Invention

The invention relates to a system and a method for interconnection of components, in particular of software components for at least one data processing application.

2. Description of the Related Art

Such a system is used, for example, in the field of software applications. In this case, there is frequently a desire to construct the individual applications from reusable components. This results in the necessity to interconnect the individual components with one another in various combinations. Components are in this case generally interconnected by special programming, which is referred to as glue code, but this may involve considerable effort.

SUMMARY OF THE INVENTION

The invention is based on the object of specifying a system and a method for interconnection of components, which allows interconnection of the components without special programming, for example in the form of what is referred to as glue code.

This object is achieved by a system and a method having interfaces, for example input/output interfaces, interconnected with one another either directly or with the interposition of the interconnection components. The effort for interconnection of the components is thus considerably reduced. Furthermore, it is possible to interconnect the components with one another in different configurations in a reusable manner. Special connection programming, for example in the form of glue code, is completely avoided, and all that is required is simple connection configuration. Overall, this leads to the interconnection intelligence being shifted from a container which surrounds the components into the components themselves. This makes it possible to design the container to be simpler since it no longer needs to have the capacity for script or programming.

Shifting the interconnection intelligence from a container which surrounds the components to the components themselves can be ensured by the interconnection components containing information which is intended for interconnection of components.

One advantageous application option is for the components to be in the form of ActiveX components, in particular input and output components.

The object of an adapter function for the interconnection components can be taken into account by the interconnection component being provided for automatic active coupling and/or for adaptation of interfaces which do not match, or do not entirely match.

The complexity, for example, for memory space for storage of interconnection information and special container configurations can thus be considerably be reduced, since the components are intended for multiple interconnection with further components.

The invention will be described and explained in more detail in the following text with reference to the exemplary embodiments, which are illustrated in the figures, in which:

DETAILED DESCRIPTION OF THE PREFERRED EMBODIMENTS

Figure 1:
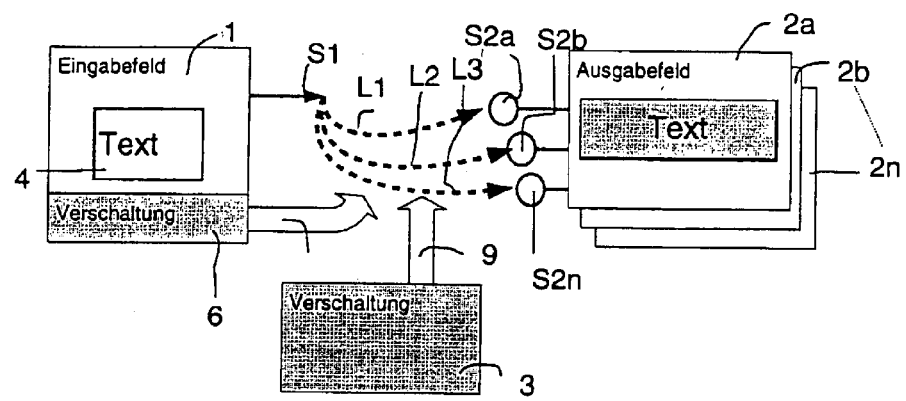
FIG. 1 is a block diagram of an exemplary embodiment of a system for interconnection of components, with direct interconnection of the components.

FIG. 1 is a block diagram of a first exemplary embodiment of a system for interconnection of components 1, 2a ... 2n, with direct interconnection of the components 1, 2a ... 2n. The first component 1 is, for example, an input component, which has an input text field 4. Furthermore, the input component 1 contains interconnection information 6, which includes interconnection information for interconnection of an interface S1 for the input component 1 with further components 2a ... 2n. The further components 2a ... 2n are, for example, output components, which have an output text field 5 for outputting a text which can be entered in the input text field 4 of the first component. Furthermore, the further components 2a ... 2n have a respective interface S2 a ... S2n, each of which can be interconnected with the interface S1. In addition to the local interconnection information 6 in the first input component 1, central interconnection information 3 is furthermore provided in the exemplary embodiment illustrated in FIG. 1 and, for example, contains centrally stored interconnection information for interconnection of the components 1, 2a ... 2n. The local interconnection information 6 and the central interconnection information 3 thus control the interconnection of the components 1, 2a ... 2n, via the signal flows which are indicated by arrows 8, 9 in FIG. 1.

The special feature of the system illustrated in FIG. 1 for interconnection of software components 1, 2a ... 2n is that the components 1, 2a ... 2n are connected to one another without any complex programming, which is referred to as glue code, since the components are connected to one another via the interfaces S1, S2 ... S2n, which generally exist in any case in the software components 1, 2a ... 2n. One application example is, for example, the interconnection of what are referred to as ActiveX components in the Microsoft Windows environment. For example, ActiveX components can be interconnected, for example, from the Internet Explorer, come from Visual Basic, etc. The input component 1 uses as the input field, for example, a defined outgoing-COM interface S1. Where the input field 4 is amended, the edited text is interconnected via the interface S1, via the lines L1 ... Ln represented by dashed lines, to the interfaces 2a ... 2n, that is to say the interfaces of the output components 2a ... 2n. The interconnection intelligence required for the interconnection of the components 1, 2a ... 2n, illustrated in the exemplary embodiment in FIG. 1, is either available locally as interconnection information 6 in the component 1, or is managed centrally at a central point as interconnection information 3. Shifting the interconnection intelligence from a container which surrounds the components, but which is not shown in any more detail in FIG. 1 for reasons of clarity, to the components 1, 2a ... 2n makes it possible to design the container to be simpler. In consequence, the container no longer needs to have a script or programming capability, thus resulting in greater independence of the containers which are actually used.

Figure 2:
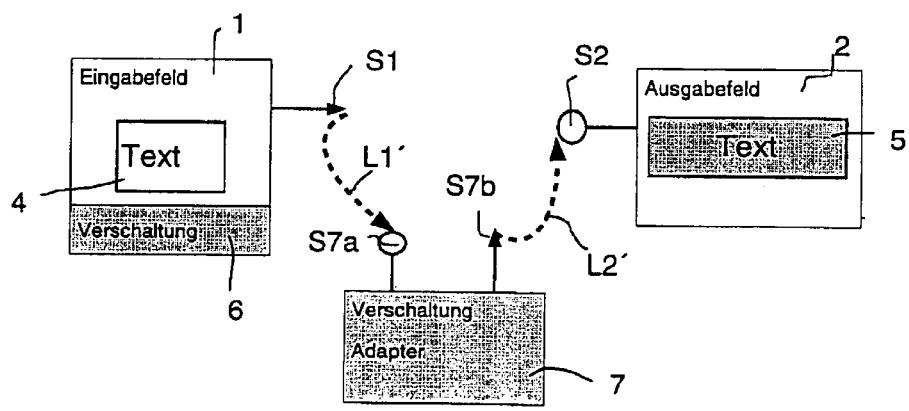
FIG. 2 is a further exemplary embodiment of a system for interconnection of components, with interconnection of the components via an intermediate interconnection component.

FIG. 2 is a further exemplary embodiment of a system for interconnection of components 1, 2. In the exemplary embodiment illustrated in FIG. 2, the components 1, 2 are not interconnected directly via the interfaces S1, S2 of the components 1, 2, but by the interposition of a special interconnection component 7. The interconnection component 7 has interfaces S7a, S7b, with the interface S1 of the input component being interconnected with the interface S7a of the interconnection component. In a similar way, the output interface S7b of the interconnection component 7 is interconnected with the input interface S2 of the output component 2.

The use of the interconnection component 7, whose object is to interconnect the input component S1 and the output component 2 with one another, also makes it possible to provide an adapter functionality. This adapter functionality may, for example, comprise the interfaces of two components 1, 2 which do not match exactly being subjected to matching by the interconnection component 2. Mapping from a method base, for example, is thus possible, which, even in the case of fen parameters at, for example, standard values, carries out range conversion etc. In order to explain the terminology, reference should be made, for example, to the book "Activ X and OLE verstehen" Understand Active X and OLE, by David Chappell, Microsoft Press, UnterschleiBheim.

In summary, the invention thus relates to a system and a method for interconnection of components 1, 2a . . . 2n, in particular of software components for at least one data processing application. For interconnection of the components 1, 2a . . . 2n without any special programming, for example in the form of what is referred to as glue code, it is proposed that the components 1, 2a . . . 2n have at least one interface S1, S2a . . . S2n, which are intended for direct interconnection of the components 1, 2a . . . 2n. In an alternative embodiment, the components 1, 2 have interfaces S1, S2, which are interconnected with one another via an interconnection component 7.

What is claimed is:

1. A system for interconnection of software components for at least one data processing application, comprising:
    a storage unit to store components surrounded by a container, the components having at least one interface intended for interconnection of the components by an interconnection component, the interconnection component, and not the container, containing information required for interconnection of the components.

2. The system as claimed in claim 1, wherein the components locally provide interconnection information containing interconnection intelligence required for the interconnection of the components.

3. The system as claimed in claim 1, wherein the components are ActiveX components.

4. The system as claimed in claim 3, wherein the components are input and output components.

5. The system as claimed in claim 1, wherein the interconnection component is intended for the components to be interconnected to search for matching interfaces.

6. The system as claimed in claim 1, wherein the components are intended for multiple interconnections with further components.

7. A method for interconnection of software components for at least one data processing application, comprising
    storing components interconnected via at least one interface and surrounded by a container that does not include information to interconnect the components; and
    interconnecting the components using an interconnection component included in the container and containing information required for interconnection of the components.

8. The method as claimed in claim 7, wherein the components locally provide interconnection information containing interconnection intelligence required for the interconnection of the components.

9. The method as claimed in claim 8, wherein the components are input and output components.

10. The method as claimed in claim 7, wherein the components are ActiveX components.

11. The method as claimed in claim 7, wherein the interconnection component searches for matching interfaces from components to be interconnected.

12. The method as claimed in claim 7, wherein the components are used for multiple interconnections with further components.

13. At least one computer-readable medium storing at least one data processing application, comprising:
    components surrounded by a container, the components having at least one interface intended for interconnection of the components by an interconnection component, the interconnection component, and not the container, containing information required for interconnection of the components.

14. The at least one computer-readable medium as claimed in claim 13, wherein the components locally provide interconnection information containing interconnection intelligence required for the interconnection of the components.

15. The at least one computer-readable medium as claimed in claim 13, wherein the components are ActiveX components.

16. The at least one computer-readable medium as claimed in claim 15, wherein the components are input and output components.

17. The at least one computer-readable medium as claimed in claim 13, wherein the interconnection component searches for matching interfaces from components to be interconnected.

18. The at least one computer-readable medium as claimed in claim 13, wherein the components are used for multiple interconnections with further components.

* * * * *